(12) United States Patent
Peng

(10) Patent No.: US 11,929,973 B2
(45) Date of Patent: Mar. 12, 2024

(54) MAIL PROCESSING METHOD AND APPARATUS, AND ELECTRONIC DEVICE, AND COMPUTER READABLE MEDIUM

(71) Applicant: Beijing Zitiao Network Technology Co., Ltd., Beijing (CN)

(72) Inventor: Longteng Peng, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/025,364

(22) PCT Filed: Sep. 10, 2021

(86) PCT No.: PCT/CN2021/117558
§ 371 (c)(1),
(2) Date: Mar. 8, 2023

(87) PCT Pub. No.: WO2022/053004
PCT Pub. Date: Mar. 17, 2022

(65) Prior Publication Data
US 2023/0328026 A1    Oct. 12, 2023

(30) Foreign Application Priority Data
Sep. 10, 2020   (CN) .......................... 202010948206.2

(51) Int. Cl.
*G06F 16/176*   (2019.01)
*G06F 16/93*    (2019.01)
(Continued)

(52) U.S. Cl.
CPC ............ *H04L 51/42* (2022.05); *G06F 40/106* (2020.01); *G06F 40/166* (2020.01)

(58) Field of Classification Search
CPC ....... H04L 51/42; H04L 57/42; G06F 40/166; G06F 40/106; G06F 16/176; G06F 16/93; G06F 21/62
(Continued)

(56) References Cited

U.S. PATENT DOCUMENTS 8,918,720 B1    12/2014  Wu et al.
2006/0080306 A1  4/2006  Land et al.
(Continued)

FOREIGN PATENT DOCUMENTS

CN    1855982 A    11/2006
CN    102171685 A    8/2011
(Continued)

OTHER PUBLICATIONS

International Patent Application No. PCT/CN2021/117558; Int'l Search Report; dated Nov. 25, 2021; 2 pages.

*Primary Examiner* — Jude Jean Gilles
(74) *Attorney, Agent, or Firm* — BakerHostetler

(57) ABSTRACT

A mail processing method is provided. The method includes: sending a first document obtaining request to a server in response to a triggering operation on target control in a mail editing page; receiving first document information of an on-line document sent by the server in response to the first document obtaining request, where authority control information of the first document information matches an account ID of a mail; sending a second document obtaining request to the server in response to a triggering operation to the first document information; receiving second document information sent by the server in response to the second document obtaining request and generating the mail in the mail editing page based on the second document information.

18 Claims, 8 Drawing Sheets

(51) Int. Cl.
*G06F 21/62* (2013.01)
*G06F 40/106* (2020.01)
*G06F 40/166* (2020.01)
*H04L 51/42* (2022.01)

(58) Field of Classification Search
USPC ........................................................ 709/206
See application file for complete search history.

(56) References Cited

U.S. PATENT DOCUMENTS

| | | | | |
|---|---|---|---|---|
| 2011/0238682 A1* | 9/2011 | Ootaki | ................ | G06F 21/6227 707/758 |
| 2013/0117376 A1 | 5/2013 | Filman et al. | | |
| 2015/0154156 A1 | 6/2015 | Meyers, Jr. et al. | | |
| 2017/0099297 A1* | 4/2017 | Armer | .................... | H04L 63/102 |
| 2017/0193079 A1* | 7/2017 | Vartanov | ................. | H04L 51/06 |
| 2018/0137467 A1* | 5/2018 | Jung | ........................ | H04L 51/42 |
| 2018/0165260 A1 | 6/2018 | Soni | | |
| 2018/0309708 A1* | 10/2018 | Potvin | .................... | G06N 5/046 |

FOREIGN PATENT DOCUMENTS

| | | |
|---|---|---|
| CN | 102930424 A | 2/2013 |
| CN | 103907110 A | 7/2014 |
| CN | 104717129 A | 6/2015 |
| CN | 109299354 A | 2/2019 |
| CN | 109918345 A | 6/2019 |
| CN | 110399459 A | 11/2019 |
| CN | 110765357 A | 2/2020 |
| CN | 111581555 A | 8/2020 |
| CN | 112073307 A | 12/2020 |

\* cited by examiner

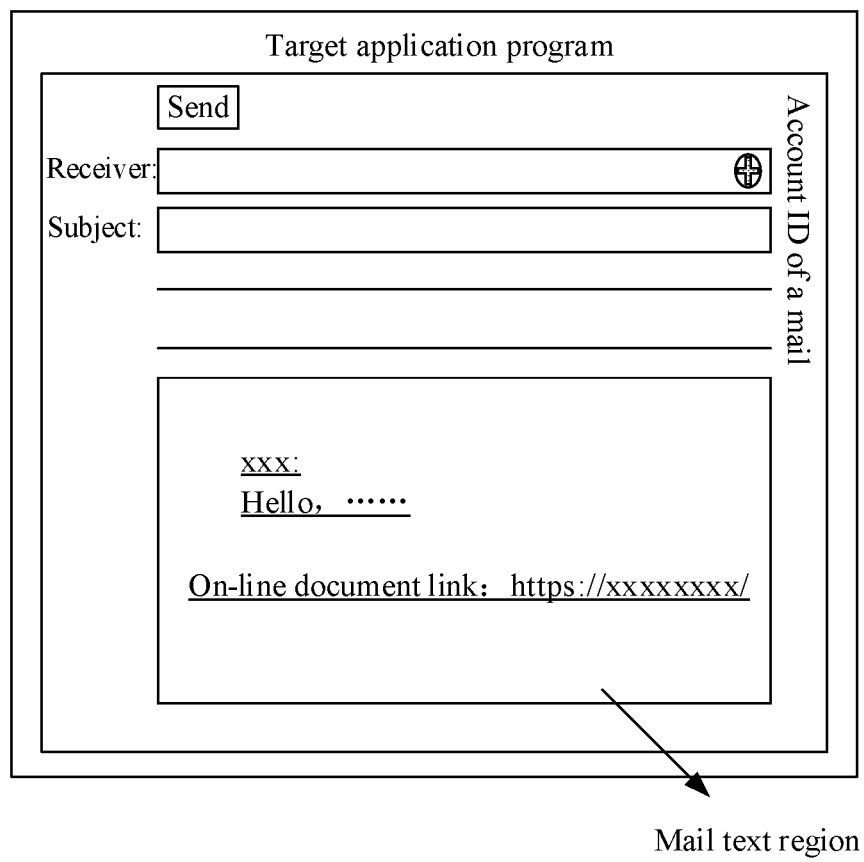
Figure 2（a）

MAIL PROCESSING METHOD AND APPARATUS, AND ELECTRONIC DEVICE, AND COMPUTER READABLE MEDIUM

CROSS REFERENCE OF RELATED APPLICATION

The present application is a National phase application of PCT international patent application PCT/CN2021/117558 filed on Sep. 10, 2021, which claims the priority to Chinese Patent Application No. 202010948206.2, titled "MAIL PROCESSIGN METHOD AND APPARATUS, ELECTRONIC DEVICE AND COMPUTER READABLE MEDIUM", filed on Sep. 10, 2020, with the State Intellectual Property Office of the PRC, both of which are incorporated herein by reference in their entireties.

FIELD

The present disclosure relates to the technical field of computers, and in particular to a mail processing method and apparatus, an electronic device and a computer readable medium.

BACKGROUND

Presently, an email is a communication mode for information exchange electronically, and is a service technology widely applied in the Internet applications. A user may quickly contact with other network user through a network email system.

Presently, the user may copy information of a document and paste the information to a mail text or title to generate a mail. If the information of the document cannot be copied, the user needs to write the mail manually, resulting in low mail generation efficiency and long time consumption.

SUMMARY

This section is provided to introduce the concept briefly, and the concept is described in detail in specific embodiments hereinafter. This section is neither intended to identity key features or necessary features of the claimed technical solutions, nor intended to limit scope of the claimed technical solutions.

In a first aspect of the present disclosure, a mail processing method is provided. The method includes: sending a first document obtaining request to a server in response to a triggering operation on target control in a mail editing page; receiving first document information of an on-line document sent by the server in response to the first document obtaining request, where authority control information of the first document information matches an account ID of a mail; sending a second document obtaining request to the server in response to a triggering operation to the first document information; receiving second document information sent by the server in response to the second document obtaining request; and generating the mail in the mail editing page based on the second document information.

In a second aspect of the present disclosure, a mail processing method is provided. The method includes: receiving a first document obtaining request sent from a terminal device; sending, in response to the first document obtaining request, first document information of an on-line document to the terminal device, where authority control information of the first document information matches an account ID of a mail; receiving a second document obtaining request sent by the terminal device in response to a triggering operation to the first document information; and sending second document information to the terminal device in response to a second document obtaining request, so that the terminal device generates a mail in a mail editing page based on the second document information.

In a third aspect of the present disclosure, a mail processing apparatus is provided. The apparatus includes: a first sending module, configured to send a first document obtaining request to a server in response to a triggering operation on target control in a mail editing page; a first receiving module, configured to receive first document information of an on-line document sent by the server in response to the first document obtaining request, where authority control information of the first document information matches an account ID of a mail; a second sending module, configured to send a second document obtaining request to the server in response to a triggering operation to the first document information; a second receiving module, configured to receive second document information sent by the server in response to the second document obtaining request; and a generating module, configured to generate the mail in the mail editing page based on the second document information.

In a fourth aspect of the present disclosure, a mail processing apparatus is provided. The apparatus includes: a third receiving module, configured to receive a first document obtaining request sent from a terminal device; a third sending module, configured to send, in response to the first document obtaining request, first document information of an on-line document to the terminal device, where authority control information of the first document information matches an account ID of a mail; a fourth receiving module, configured to receive a second document obtaining request sent by the terminal device in response to a triggering operation to the first document information; and a fourth sending module, configured to send second document information to the terminal device in response to a second document obtaining request, so that the terminal device generates a mail in a mail editing page based on the second document information.

In a fifth aspect of the present disclosure, an electronic device is provided. The electronic device includes: a memory and a processor. The memory is configured to store computer programs. The processor is configured to implement the method according to any of the first aspect and the second aspect when executing the computer programs.

In a sixth aspect of the present disclosure, a computer readable medium storing computer programs is provided. The computer programs are executed by a processor to implement the method according to any of the first aspect and the second aspect.

The embodiments of the present application can generate the following beneficial effects. In response to a triggering operation on target control in a mail editing page, a first document obtaining request is sent to a server. First document information of an on-line document sent by the server in response to the first document obtaining request is received. Authority control information of the first document information matches an account ID of the mail. It follows that, the terminal device can obtain the first document information of the on-line document sharing the same account ID with the mail. The terminal device sends a second document obtaining request to the server in response to a triggering operation to the first document information, and receives second document information sent by the server in response to the second document obtaining request.

In this way, the terminal device can generate the mail in the mail editing page based on the second document information of the on-line document without opening the on-line document to copy content of the on-line document and paste the content to the mail and without manually writing the mail, thereby improving the mail generation efficiency and reducing the mail generation time.

BRIEF DESCRIPTION OF THE DRAWINGS

With reference to the drawings and specific embodiments below, the above and other features, advantages and aspects of the present disclosure become more apparent. Throughout the drawings, the same or similar reference numerals indicate the same or similar elements. It should be understood that the drawings are schematic, and components and elements are unnecessarily drawn in scale.

DETAILED DESCRIPTION OF EMBODIMENTS

Embodiments of the present disclosure are described in detail hereinafter with reference to the drawings. Although the drawings show some embodiments of the present disclosure, it should be understood that the present disclosure may be implemented by various embodiments and are not limited to be implemented by the embodiments clarified herein. The embodiments described in the present disclosure are intended to illustrate the present disclosure thoroughly and completely. It should be understood that the drawings and the embodiments are only schematic, and are not intended to limit the protection scope of the present disclosure.

It should be understood that, steps described in the method embodiments of the present disclosure may be performed in different orders and/or performed in parallel. In addition, the method embodiments may include additional steps and/or steps omitted. The scope of the present disclosure is not limited thereto.

The term "including" and variations thereof adopted herein is inclusive, that is "including but not limited to". The term "based on" means "at least partially based on". The term "one embodiment" means "at least one embodiment", and the term "another embodiment" means "at least another embodiment". The term "some embodiments" means "at least some embodiments". Definitions of other terms are provided below.

It should be noted that, the terms "first"' "second" and so on mentioned in the present disclosure are only used to distinguish different apparatuses, modules or units, rather than limit an order of functions performed by the apparatus, module or unit or limit interdependence.

It should be noted that, the terms "one" and "multiple" mentioned in the present disclosure are schematic rather than restrictive, and should be understood as "one or more" by those skilled in the art, otherwise explicitly illustrated in the context.

Names of messages or information interacted between multiple apparatuses in the embodiments of the present disclosure are illustrative rather than limit the scope of the message or information.

Figure 1:
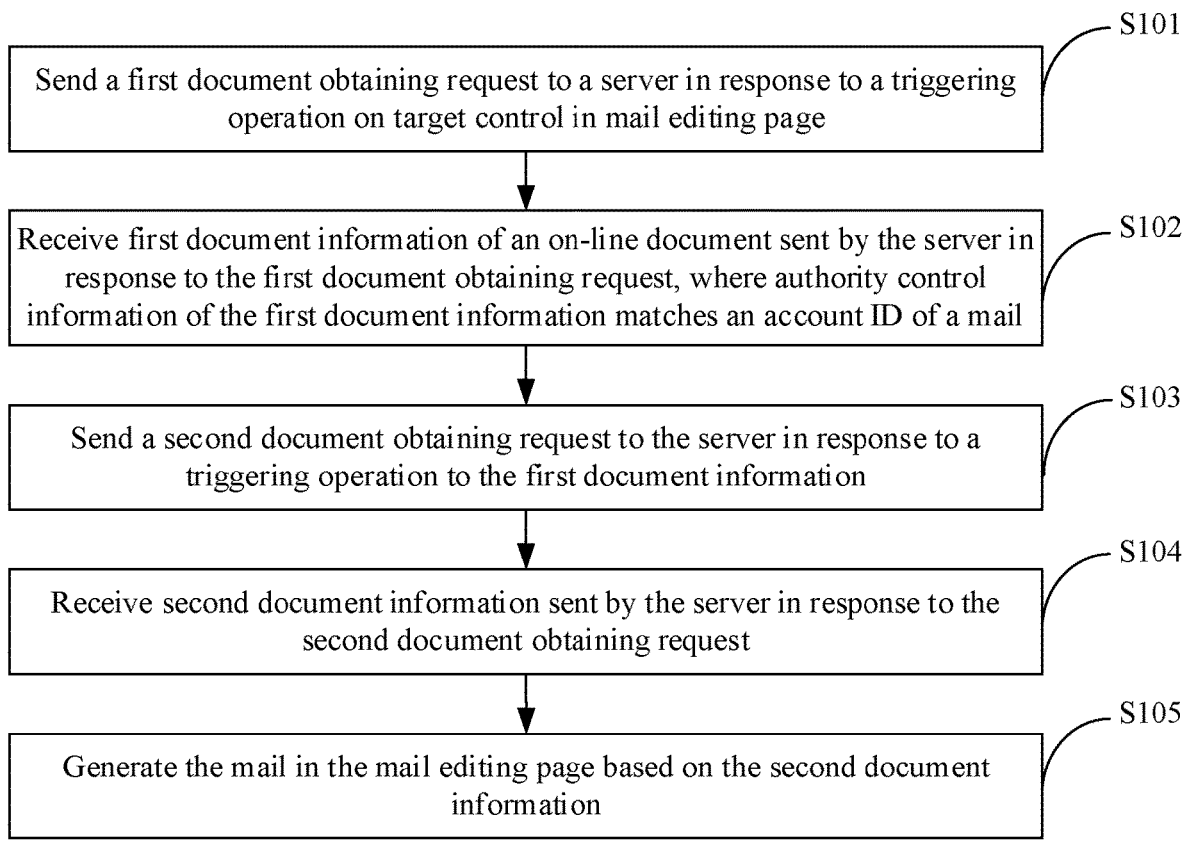
FIG. 1 is a schematic diagram of a mail processing method according to an embodiment of the present disclosure.

FIG. 1 shows a mail processing method according to an embodiment of the present disclosure. The method is performed by a terminal device which may be a desktop device or a mobile terminal. The method includes steps S101 to S105 as follows.

In step S101, a first document obtaining request is sent to a server in response to a triggering operation on target control in a mail editing page. The terminal device starts a mailbox and establishes a new mail. A mail editing page of the newly established mail includes target control. The terminal device detects a first document obtaining request sent to the server by a user triggering the target control. The first document obtaining request is used to obtain document information of an on-line document.

In step S102, the server sends first document information of the on-line document in response to the first document obtaining request. Authority control information of the first document information matches an account ID of a mail. The server prestores multiple on-line documents which are already edited. In response to the first document obtaining request, the server determines one or more on-line documents from the prestored multiple on-line documents, and thus the server sends first document information in one-to-one correspondence with the one or more on-line documents to the terminal device.

In the embodiment, the process of determining one or more on-line documents from the prestored multiple on-line documents by the server may include: determining that authority control information of the first document information of the on-line document matches a certain account ID in a case that the on-line document is generated by editing through logging in the account ID (Identity document) by the terminal device; and determining, by the server, one or more on-line documents accessible by the account ID of the mail from the prestored multiple on-line documents based on the account ID of the mail in the first document obtaining request. The account ID of the mail may be a user ID logging the mailbox.

In the embodiment, the first document information of each on-line document may be identifier information of the on-line document (for example a name of the on-line document).

In the embodiment, the application and mailbox for editing and generating the on-line document are internet products installed in the terminal device. The on-line document may be understood as a word document which can be edited on-line by the user. The application and the mailbox corresponding to the on-line document may be a webpage, may be an application installed in the terminal device or an application opened by a third party browser.

In the embodiment, the mail shares the same account ID with the on-line document, thereby accessing the on-line document by the mailbox.

In step S103, a second document obtaining request is sent to the server in response to a triggering operation to the first document information. The terminal device displays the first document information when receiving the first document information, so that the terminal device sends a second document obtaining request to the server on receipt of the triggering operation to the first document information by the user.

In the embodiment, if the first document information is first document information in one-to-one correspondence with at least one on-line document, the triggering operation to the first document information by the user may be a selection operation on any of the at least one piece of first document information. The second document obtaining request includes the first document information.

In step S104, second document information sent by the server in response to the second document obtaining request is received. The server determines the on-line document corresponding to the first document information based on the first document information included in the second document obtaining request, and then sends second document information of the on-line document to the terminal device.

In the embodiment, the second document information may be a link, content and/or a title of the on-line document.

The content of the on-line document may be at least one of a word, a picture, an image, a video and an audio.

In step S105, a mail is generated in the mail editing page based on the second document information.

The terminal device may generate the mail in the mail editing page by taking the second document information as a mail text.

In the embodiment, in response to a triggering operation on target control in a mail editing page, a first document obtaining request is sent to a server. First document information of an on-line document sent by the server in response to the first document obtaining request is received. Authority control information of the first document information matches an account ID of the mail. It follows that, the terminal device can obtain the first document information of the on-line document sharing the same account ID with the mail. The terminal device sends a second document obtaining request to the server in response to a triggering operation to the first document information, and receives second document information sent by the server in response to the second document obtaining request. In this way, the terminal device can generate the mail in the mail editing page based on the second document information of the on-line document without opening the on-line document to copy content of the on-line document and paste the content to the mail and without manually writing the mail, thereby improving the mail generation efficiency and reducing the mail generation time.

Optionally, the process of sending a first document obtaining request to the server in step S101 includes: obtaining an account ID of a mail; and sending a first document obtaining request to the server, where the first document obtaining request includes an account ID of the mail.

The terminal device obtains the account ID of the mail when detecting the triggering operation on the target control in the mail editing page by the user, and generates the first document obtaining request including the account ID. The terminal device sends the first document obtaining request to the server, so that the server sends the first document information of the on-line document to the terminal device in response to the first document obtaining request.

In an embodiment, the process of sending first document information of an on-line document to the terminal device in response to the first document obtaining request includes: determining at least one on-line document accessible by the account ID based on the account ID; and sending the first document information of the at least one on-line document to the terminal device.

The application and the mailbox corresponding to the on-line document in the terminal device are products in a suite. The suite refers to a set of office products. If the products share the same ID, the products can be associated with each other through the user account to share data.

After the terminal device edits and generates the on-line document based on an application corresponding to the on-line document logged in based on a certain account ID, the server may establish a matching relationship between the account ID and authority control information of the generated on-line document. If the terminal device logs in a mailbox through the account ID, the server may, after the terminal device sends the first document obtaining request to the server, determine at least one on-line document accessible by the account ID in the first document obtaining request and sends first document information of at least one on-line document to the terminal device, thereby sharing data between the mailbox and the on-line document.

Optionally, the first document information includes at least one identifier of the on-line document. The triggering operation to the first document information includes selecting a target identifier among the at least one identifier.

In the embodiment, the first on-line document information received by the terminal device may be an identifier of at least one on-line document, for example a document name of the at least one on-line document. In this case, the triggering operation to the first document information may be a selection operation of a target identifier among identifiers of the at least one on-line document. The target identifier is any identifier selected by the user.

The terminal device may send a second document obtaining request to the server when detecting the selection operation of the target identifier by the user. The server may send second document information to the terminal device in response to the second document obtaining request. In the embodiment, the second document obtaining request includes the following two cases.

In a first case, the second document obtaining request includes only a target identifier. In this case, the process of sending second document information to the terminal device in response to the second document obtaining request includes: directly sending the target identifier selected by the user to the server from the terminal device; and determining, by the server, a target on-line document corresponding to the target identifier based on the target identifier; and returning, by the server, second document information of the target on-line document to the terminal device.

In a second case, the second document obtaining request includes an account ID of the mail and a target identifier. In this case, the process of sending second document information to the terminal device in response to the second document obtaining request includes: determining a target on-line document of the on-line document indicted by the target identifier; and sending second document information of the target on-line document to the terminal device if it is determined that the target on-line document matches the account ID.

The terminal device may send the target identifier selected by the user and the account ID to the server, so that the server verifies again whether authority control information of the target on-line document corresponding to the target identifier matches the account ID, that is, verifying whether the account ID has authority to access the target on-line document indicated by the target identifier. If the account ID has the access authority to the target on-line document, the server sends second document information of the target on-line document to the terminal device.

The embodiment may be applied to the following scenario. It is verified whether the user ID has access authority to the target on-line document indicated by the target identifier, to solve the problem that the target identifier selected by the user from identifiers of the at least on-line document is not returned by the server, a new identifier is added, and the new identifier is selected as the target identifier.

In the embodiment, the server performs authority verification on the terminal device for multiple times, thereby ensuring security of data sharing between different products and being beneficial to enhancing information security.

Optionally, if the second document information includes a link of the target on-line document indicated by the target identifier, the process of generating a mail in a mail editing page based on the second document information includes: generating the mail in the mail editing page by taking the link as a mail text.

In the embodiment, if the second document information is the link of the target on-line document, the terminal device generates the mail in the mail editing page by taking the link directly as the mail text. When the mail is sent, a mail receiver may directly jump to a webpage corresponding to the link, that is, the target on-line document, by clicking the link.

In the embodiment, the link may be displayed in a color different from that of other content in the mail.

Figure 2:
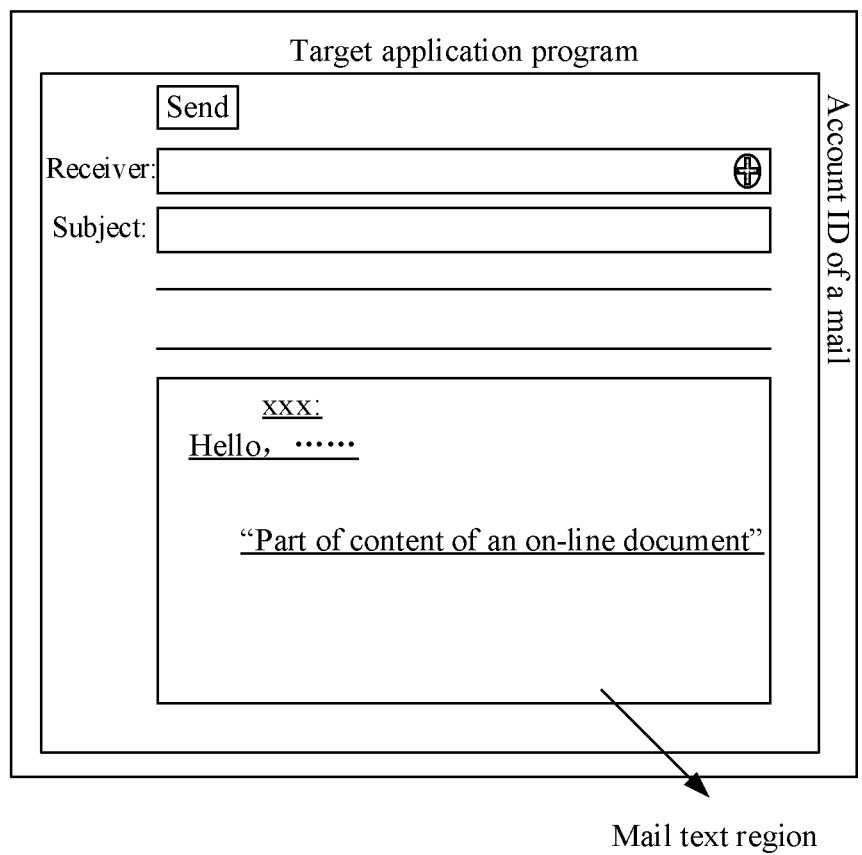
FIG. 2(a) is a schematic diagram of a scenario of the mail processing method according to the present disclosure.
FIG. 2(b) is a schematic diagram of another scenario of the mail processing method according to the present disclosure.
FIG. 2(c) is a schematic diagram of another scenario of the mail processing method according to the present disclosure
Figure 2:
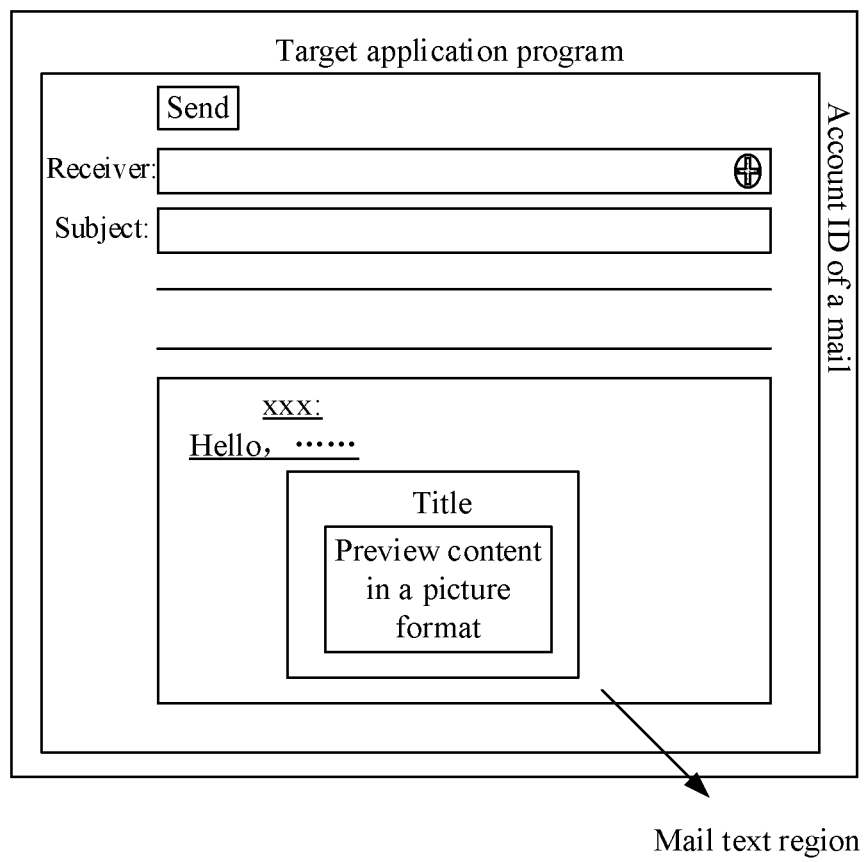

Referring to FIG. 2(a), in a possible scenario, a mail editing page of a newly established mail includes an account ID of the mail, a receiver input box and a subject input box and so on; a user may insert an on-line document link Http://xxxxxx/in a mail text region after editing some content (for example "hello, xxx") in the mail text region.

Optionally, after the server returns the second document information to the terminal device, the terminal device may adjust a display mode of the second document information to generate the mail in the mail editing page.

In an embodiment, the second document information includes document content of the target on-line document indicated by the target identifier. In this case, the process of generating the mail in the mail editing page based on the second document information includes: generating the mail in the mail editing page based on the document content and in a preset display mode.

In the embodiment, the server may directly extract all or a part of content of the target on-line document, for example extracting at least one of words, pictures and videos of the target on-line document. The terminal device generates the mail in the mail editing page in a preset display mode after receiving the document content sent by the server.

In the embodiment, the preset display mode may be reference, for example, the document content is displayed in a reference box. Alternatively, the preset display mode may be one or more of a preset color, a preset font size, highlight display and an alignment mode.

Referring to FIG. 2(b), in a possible scenario, a mail editing page of a newly established mail includes: an account ID of the mail, a receiver input box and a subject input box and so on; and a user may insert a part of content of the on-line document and refer to the content by a double approach number in the mail text region, after editing some content (for example "hello, xxx") in the mail text region.

In an embodiment, the second document information includes document content and a document title of the target on-line document indicated by the target identifier. In this case, the process of generating a mail in the mail editing page based on the second document information includes: extracting preview content from the document content; converting the preview content from a word format into a picture format; and generating the mail in the mail editing page based on the preview content in the picture format and the document title.

In the embodiment, the second document information may be document content and the document title of the target on-line document indicated by the target identifier. The document title refers to a title of the target on-line document. The terminal device may extract preview content from the document content, converts the preview content from a word format into a picture format, and thus generates the mail in the mail editing page by taking the preview content in the picture format and the title as the mail text.

In the embodiment, the preview content may be a part of the document content, for example, an abstract of the document.

Referring to FIG. 2(c), in a possible scenario, a mail editing page of a newly established mail includes: an account ID of the mail, a receiver input box and a subject input box and so on; and a user may insert an information card in the mail text region, after editing some content (for example "hello, xxx") in the mail text region. The title of the document is displayed at top of the card, and the preview content in the picture format is displayed below the title.

Figure 3:
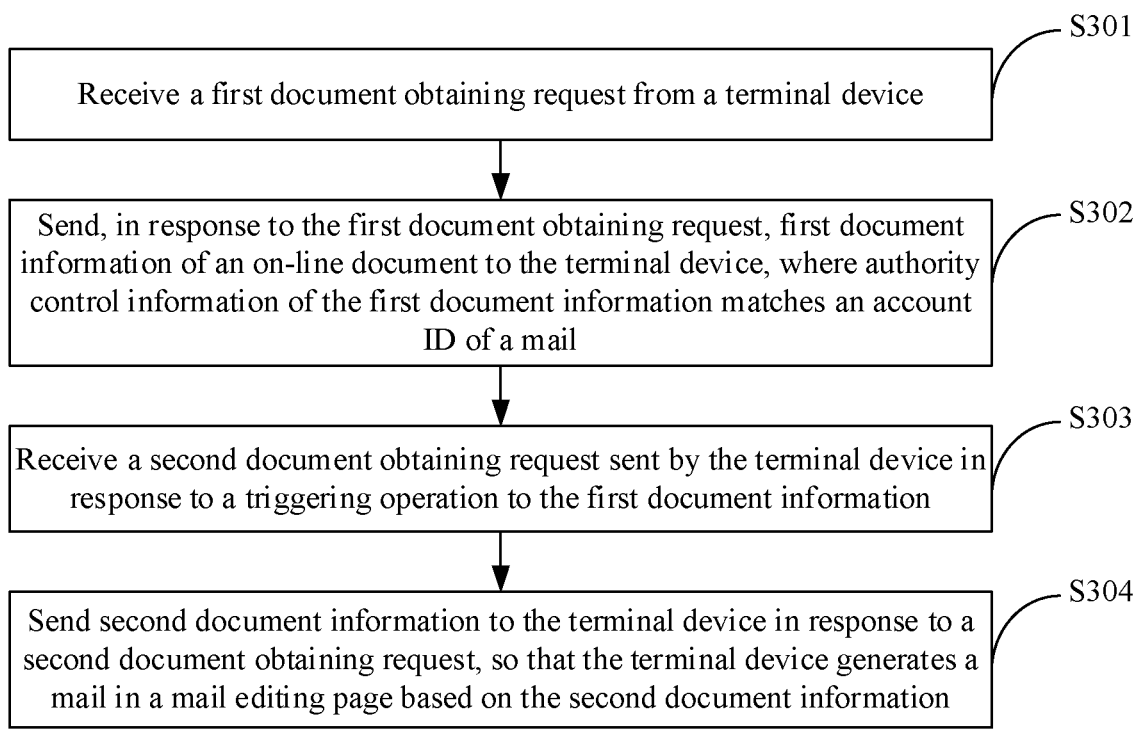
FIG. 3 is a schematic diagram of a mail processing method according to another embodiment of the present disclosure.

The technical solutions of the embodiments of the present disclosure are described above from the terminal device side. The technical solutions of the present disclosure will be described below from a server side. Referring to FIG. 3, a mail processing method is provided according to the present disclosure. The method includes steps S301 to S304 as follows.

In step S301, a first document obtaining request sent by a terminal device is received.

In step S302, first document information of an on-line document is sent to the terminal device in response to the first document obtaining request. Authority control information of the first document information matches an account ID of a mail.

In step S303, a second document obtaining request sent by the terminal device in response to a triggering operation to the first document information is received.

In step S304, second document information is sent to the terminal device in response to the second document obtaining request, so that the terminal device generates a mail in a mail editing page based on the second document information.

It should be noted that, the method shown in the embodiment and the method shown in FIG. 1 share the same invention concept. Therefore, for the solutions described in the method shown in the embodiment and optional embodiments, one may refer to the solutions described in the method shown in FIG. 1 and optional embodiments, and details are not described herein.

Optionally, the second document obtaining request includes a mail identifier. Before the second document information is sent to the terminal device, the method further includes: converting a format of the second document information into a format applicable to the mail based on the mail identifier.

In the embodiment, the second document information returned to the terminal device from the server may be document information which is subjected to format conversion. Editors of different internet products are different, and storage formats of underlying data are also different. In the embodiment, the second document obtaining request further includes a data format of a mailbox. The server may determine the data format of the mailbox after obtaining the second document information of the on-line document. The server converts the data format of the second document information into a data format applicable to the mailbox, and returns the second document information which is subjected to data format conversion to the terminal device.

In the embodiment, the data format refers to a data storage format, for example, binary numbers, characters or values.

In an embodiment, the second document information may be document information which is subjected to display mode adjustment. If the second document obtaining request includes a mailbox display mode, the server adjusts arrangement of the second document information into the mailbox display mode in response to the second document obtaining request, and returns the adjusted second document information to the terminal device. In this way, the terminal device may take the adjusted second document information as the mail text for displaying on the mail editing page.

In an embodiment, the display mode of the second document information is adjusted by the terminal device. Details are not described herein.

In the embodiment, the mail conforming to mailbox arrangement standard can be quickly generated, thereby optimizing a display effect of the generated mail and simplifying user operations.

Figure 4:
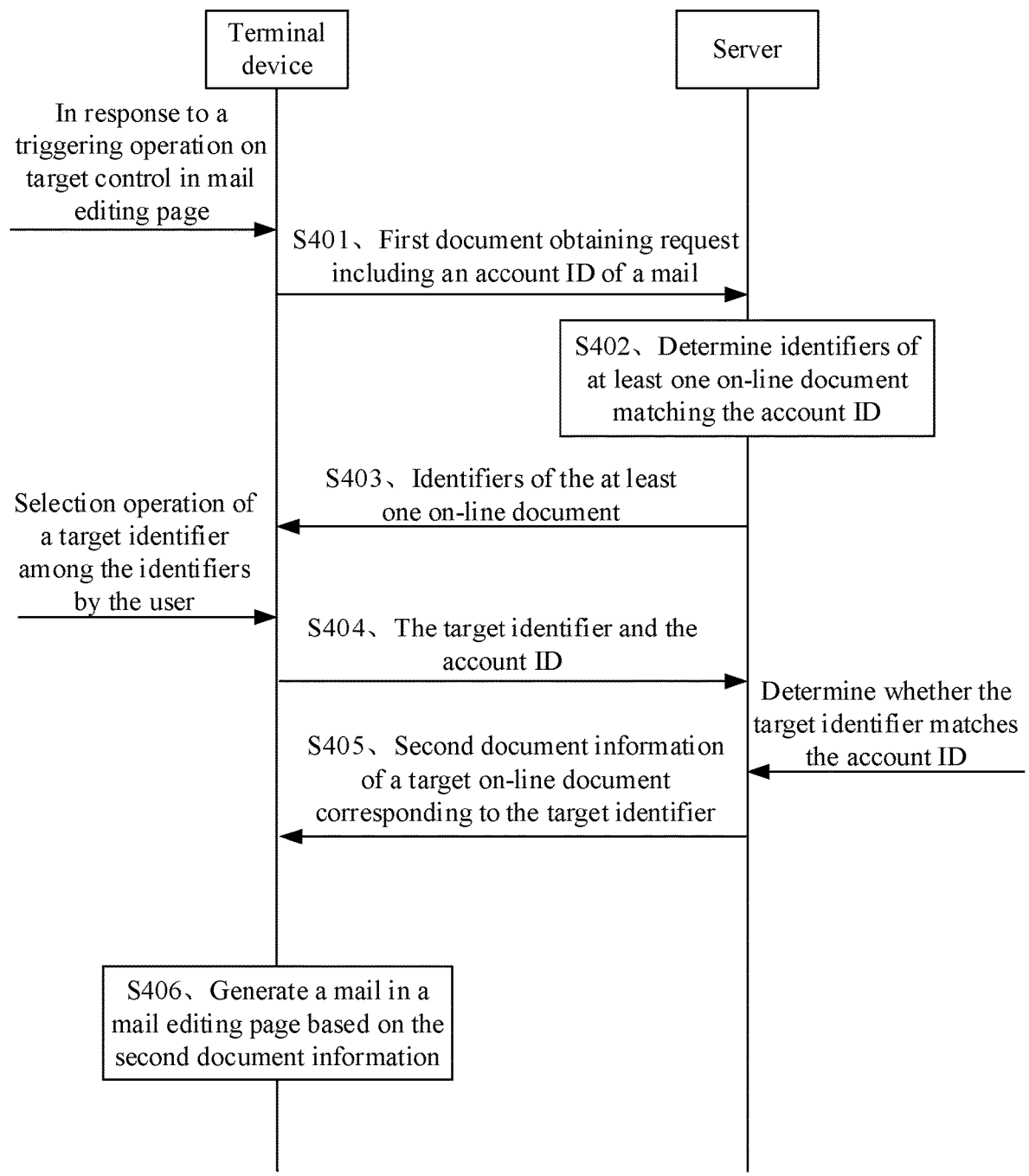
FIG. 4 is a schematic diagram of a mail processing method according to another embodiment of the present disclosure.

The technical solutions of the present disclosure are described by interaction between the terminal device and the server with reference to FIG. 4 hereinafter.

In step S401, the terminal device sends a first document obtaining request including an account ID of a mail to the server, in response to a triggering operation on target control in the mail editing page.

In step S402, the server determines identifiers of at least one on-line document matching the account ID.

In step S403, the server sends the identifiers of the at least one on-line document to the terminal device.

In step S404, the terminal device sends a target identifier and the account ID to the server, when detecting a selection operation of the target identifier among the identifiers by the user.

In step S405, the server sends second document information of a target on-line document corresponding to the target identifier, when determining that the target identifier matches the account ID.

In step S406, the terminal device generates a mail in the mail editing page based on the second document information.

It should be noted that, the method shown in the embodiment shares the same technical solution with the methods shown in FIGS. 1 and 3. Therefore, for the method shown in the embodiment and optional embodiments, one may refer to the methods shown in FIGS. 1 and 3 and optional embodiments, and details are not described herein.

Figure 5:
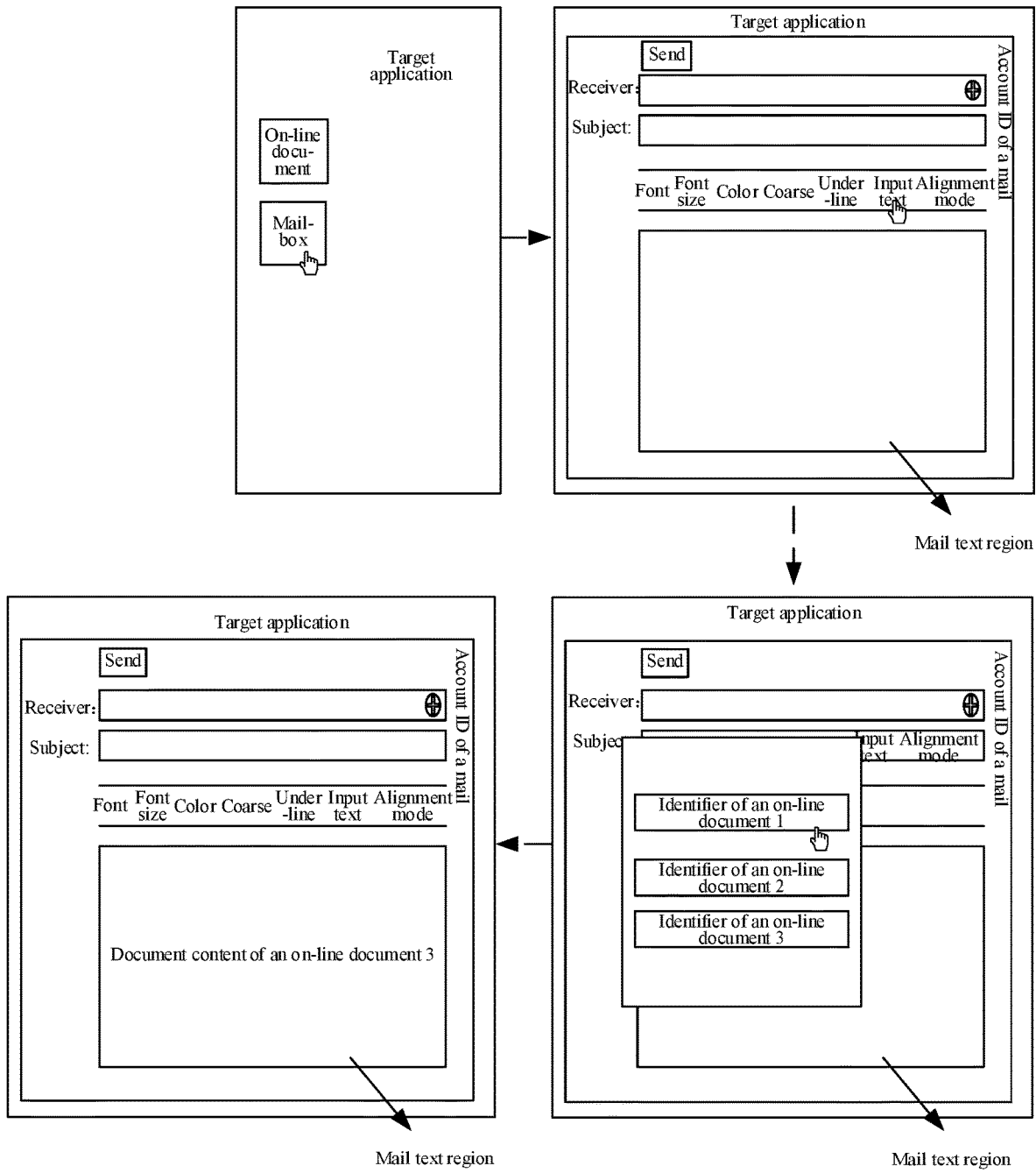
FIG. 5 is a schematic diagram of another scenario of the mail processing method according to an embodiment of the present disclosure.

In the embodiment of the present disclosure, the on-line document and the mail may be integrated in the target application. The target application includes start control for the on-line document and the mail, to start the on-line document or the mail to perform corresponding operations. The edited on-line document is stored in the server. An application scenario is introduced in conjunction with FIG. 5.

On-line document control and mailbox control are displayed on a display page of the target application. A user clicks the mailbox control to establish a new mail. A mail editing page of the newly established mail includes: an account ID of the mail, a receiver input box, a subject input box, control for adjusting arrangement of the mail text such as font, font size, color, coarse, underline and alignment mode, and further includes input document control. The user may send the first document obtaining request to the server by clicking the input document control. The first document obtaining request includes the account ID.

The server stores multiple on-line documents established by the terminal device by logging in the account ID of the mail, and pre-establishes matching relationship between the account ID and authority control information of the multiple on-line documents. After receiving the first document obtaining request sent by the terminal device, the server may return, based on the account ID included in the first document obtaining request, identifiers of an on-line document 1, an on-line document 2 and an on-line document 3 accessible by the account ID. The user selects the identifier of the on-line document 1, the terminal device sends a second document obtaining request including the identifier of the on-line document 1 and the account ID to the server, so that the server determines whether the account ID matches authority control information of the on-line document 1 based on the account ID. If the account ID matches the authority control information of the on-line document 1, the server extracts document content of the on-line document 1, and the terminal device displays the received document content of the on-line document 1 in the mail text region as the text of the mail. The user may send the mail by clicking the sending control after editing a receiver and a subject.

Figure 6:
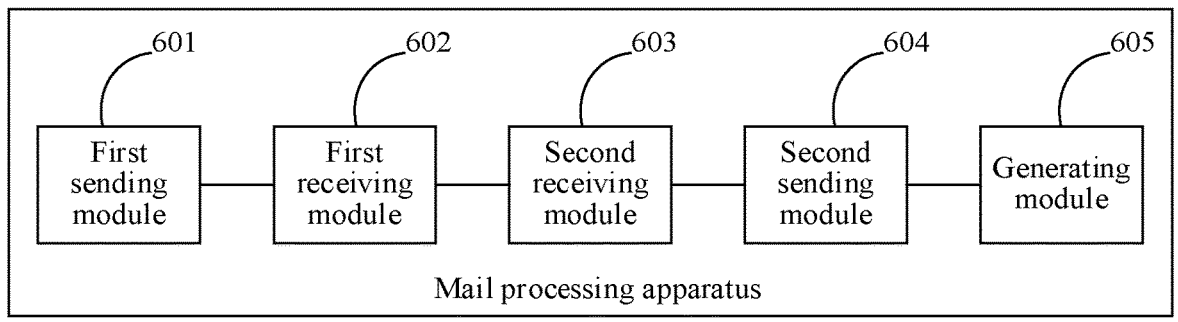
FIG. 6 is a schematic structural diagram of a mail processing apparatus according to an embodiment of the present disclosure.

FIG. 6 shows a mail processing apparatus according to embodiments of the present disclosure. The apparatus includes a first sending module 601, a first receiving module 602, a second sending module 603, a second receiving module 604 and a generating module 605. The first sending module 601 is configured to send a first document obtaining request to a server in response to a triggering operation on target control in a mail editing page. The first receiving module 602 is configured to receive first document information of an on-line document sent by the server in response to the first document obtaining request, where authority control information of the first document information matches an account ID of a mail. The second sending module 603 is configured to send a second document obtaining request to the server in response to a triggering operation to the first document information. The second receiving module 604 is configured to receive second document information sent by the server in response to the second document obtaining request. The generating module 605 is configured to generate the mail in the mail editing page based on the second document information.

In an embodiment, the first sending module 601 is configured to: obtain the account ID of the mail; and send the first document obtaining request to the server. The first document obtaining request includes the account ID of the mail.

In an embodiment, the first document information includes at least one identifier of the on-line document. The triggering operation to the first document information includes selecting a target identifier among the at least one identifier.

In an embodiment, the second document information includes a link of a target on-line document indicated by the target identifier. The generating module 605 is configured to generate the mail in the mail editing page by taking the link as a mail text.

In an embodiment, the second document information includes document content of a target on-line document indicated by the target identifier. The generating module 605 is configured to: generate the mail in the mail editing page based on the document content and in a preset display mode.

In an embodiment, the second document information includes document content and a document title of a target on-line document indicated by the target identifier. The generating module 605 is configured to extract preview content from the document content; convert the preview content from a word format into a picture format; and generate the mail in the mail editing page based on the preview content in the picture format and the document title.

Figure 7:
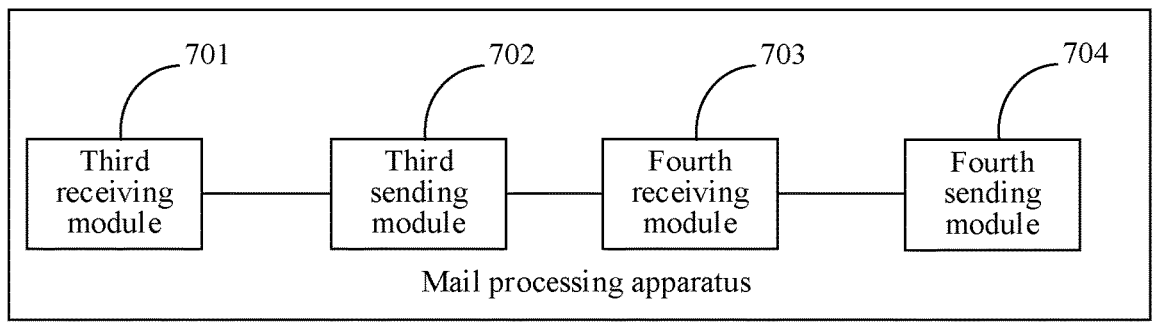
FIG. 7 is a schematic structural diagram of a mail processing apparatus according to an embodiment of the present disclosure.

FIG. 7 shows a mail processing apparatus according to embodiments of the present disclosure. The apparatus includes a third receiving module 701, a third sending module 702, a fourth receiving module 703 and a fourth sending module 704.

The third receiving module 701 is configured to receive a first document obtaining request sent from a terminal device.

The third sending module 702 is configured to send, in response to the first document obtaining request, first document information of an on-line document to the terminal device, where authority control information of the first document information matches an account ID of a mail.

The fourth receiving module 703 is configured to receive a second document obtaining request sent by the terminal device in response to a triggering operation to the first document information.

The fourth sending module 704 is configured to send second document information to the terminal device in response to a second document obtaining request, so that the terminal device generates a mail in a mail editing page based on the second document information.

In an embodiment, the first document obtaining request includes the account ID of the mail. The third sending module 702 is configured to: determine at least one on-line document accessible by the account ID based on the account ID; and send first document information of the at least one on-line document to the terminal device.

In an embodiment, the second document obtaining request includes the account ID of the mail and a target identifier. The fourth sending module 704 is configured to: determine a target on-line document among the on-line document indicted by the target identifier based on the target identifier; and send second document information of the target on-line document to the terminal device if it is determined that the target on-line document matches the account ID.

In an embodiment, the apparatus further includes a format conversion module and the second document obtaining request further includes a mail identifier. Before the fourth sending module 704 sends second document information to the terminal device, the format conversion module is configured to: convert a format of the second document information into a format applicable to the mail based on the mail identifier.

Figure 8:
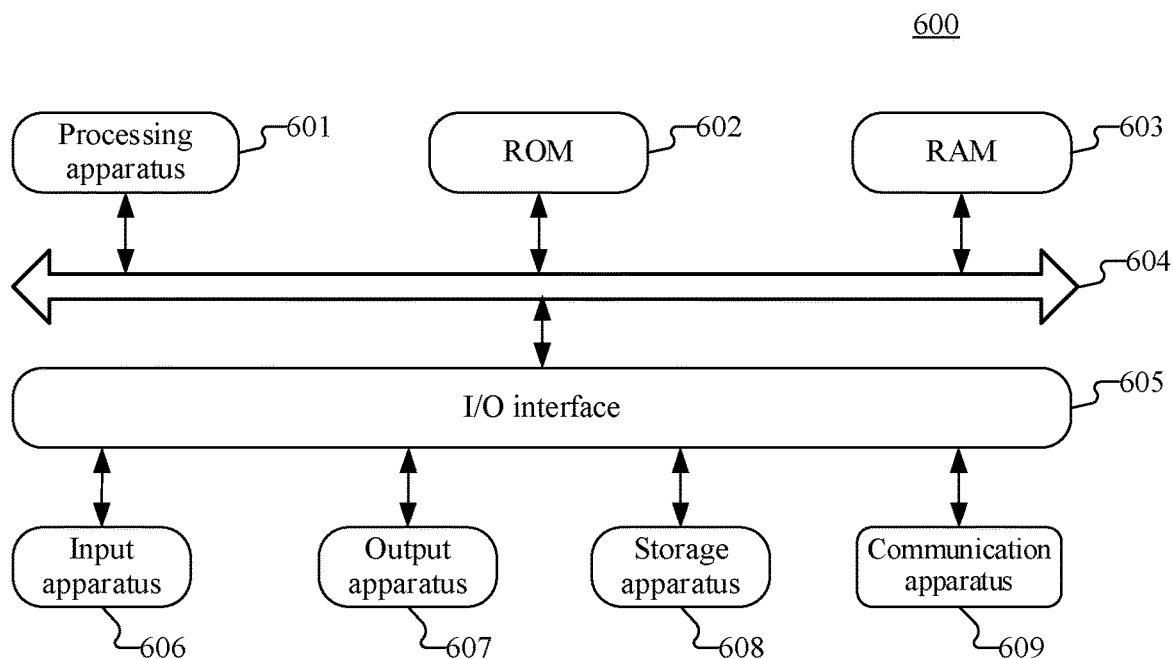
FIG. 8 is a schematic structural diagram of an electronic device according to an embodiment of the present disclosure.

Reference is made to FIG. 8 which shows a schematic structural diagram of an electronic device 600 (for example the terminal device shown in FIG. 1 or the server shown in FIG. 3) for implementing the embodiments of the present disclosure. The electronic device in the embodiments of the present disclosure may include but not limited to mobile terminals such as a mobile phone, a notebook computer, a digital broadcast receiver, a personal digital assistance (PDA), a tablet computer (PAD), a portable multi-media player (PMP) and a vehicle terminal (such as a vehicle navigation terminal); and fixed terminals such as digital TV and a desktop computer. The electronic device shown in FIG. 8 is schematic, and is not intended to limit functions and scope of the embodiments of the present disclosure.

The electronic device includes a memory and a processor. The processor may be referred to as a processing apparatus 601 below, and the memory may include at least one of a read only memory (ROM) 602, a random access memory (RAM) 603 and a storage apparatus 608.

As shown in FIG. 8, the electronic device 600 may include a processing apparatus (such as a central processor and a graphic processor) 601. The processing apparatus may perform various appropriate actions and processing by executing programs stored in a read-only memory (ROM) 602 or programs uploaded from a storage apparatus 608 to a random access memory (RAM) 603. Various programs and data required for operations of the electronic device 600 are also stored in the RAM 603. The processing apparatus 601, the ROM 602 and the RAM 603 are connected to each other through the bus 604. An input/output (I/O) interface 605 is also connected to the bus 604.

Generally, the following components are connected to the I/O interface 605: an input apparatus 606 such as a touch screen, a touch panel, a keyboard, a mouse, a camera, a microphone, an accelerometer, and gyroscope; an output apparatus 607 such as a liquid crystal display (LCD), a loudspeaker and a vibrator; a storage apparatus 608 such as a magnetic tape and a hard disk; and a communication apparatus 609. The communication apparatus 609 may allow the electronic device 600 to communicate with other device in a wired or wireless manner to exchange data. Although FIG. 8 shows the electronic device 600 provided with various apparatuses, it should be understood that not all shown apparatuses are necessary. Alternatively, more or less apparatuses may be included.

According to the embodiments of the present disclosure, a process described in the flowchart may be implemented by computer software programs. For example, according to an embodiment of the present disclosure, a computer program product including computer program carried on a non-transient computer readable medium is provided. The computer program includes program codes for performing the method shown in the flowchart. In such embodiment, the computer program may be downloaded and installed from the network through the communication apparatus 609, installed from the storage apparatus 608 or installed from the ROM 602. The computer program is executed by the processing apparatus 601 to perform functions defined in the methods described in the embodiments of the present disclosure.

It should be noted that, the computer readable medium described in embodiments of the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof. In some embodiments of the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may include but not limited to an electromagnetic signal, an optical signal or any combination thereof. The computer readable signal medium may be any computer readable medium other than the computer readable storage medium. The computer readable signal medium may send, propagate or transmit programs used by the instruction execution system, apparatus or device or the programs used in combination with the instruction execution system, apparatus or device. The program code included in the computer readable medium may be transmitted via any appropriate medium, including but not limited to an electric wire, an optical fiber, radio frequency (RF) or any appropriate combination thereof.

In some embodiments, the client and the server may perform communication by using any known network protocol such as Hyper Text Transfer Protocol (HTTP) or any network protocol to be developed, and may connect with digital data in any form or carried in any medium (for example, a communication network). The communication network includes a local area network (LAN), a wide area network (WAN), an international network (for example the internet), a peer-to-peer network (for example ad hoc peer-to-peer network), and any known network or network to be developed.

The computer readable storage medium may be included in the electronic device, or the computer readable storage medium may be independent from the electronic device, i.e., not being installed in the electronic device.

The computer readable medium carries one or more programs. When the one or more programs are executed by the electronic device, the electronic device is instructed to perform the following operations: sending a first document obtaining request to a server in response to a triggering operation on target control in a mail editing page; receiving first document information of an on-line document sent by the server in response to the first document obtaining request, where authority control information of the first document information matches an account ID of a mail; sending a second document obtaining request to the server in response to a triggering operation to the first document information; receiving second document information sent by the server in response to the second document obtaining request; and generating the mail in the mail editing page based on the second document information.

Alternatively, the computer readable medium carries one or more programs. When the one or more programs are executed by the electronic device, the electronic device is instructed to perform the following operations: receiving a first document obtaining request sent from a terminal device; sending, in response to the first document obtaining request, first document information of an on-line document to the terminal device, where authority control information of the first document information matches an account ID of a mail; receiving a second document obtaining request sent by the terminal device in response to a triggering operation to the first document information; and sending second document information to the terminal device in response to a second document obtaining request, so that the terminal device generates a mail in a mail editing page based on the second document information.

Computer program codes for performing operations in embodiments of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams shown in the drawings show a system architecture, function and operation which may be implemented by the system, method and computer program product according to the embodiments of the present disclosure. Each block in the flowcharts or the block diagram may represent a part of a module, a program section or codes including one or more executable instructions for implementing specified logic functions. It should be noted that, in alternative embodiments, functions denoted in the blocks may be performed in an order different from the order denoted in the drawing. For example, operations in two blocks connected successively may be performed in parallel, or may be performed in an opposite order, depending on the involved function. It should be noted that, each block in the block diagrams and/or flowcharts, and a combination of blocks in the block diagrams and/or flowcharts may be implemented by a dedicated hardware system for performing specified functions or operations, or may be implemented by a combination of dedicated hardware and computer instructions.

Modules or Units involved in the embodiments of the present disclosure may be implemented by software or hardware. Names of the modules or units do not limit the units in a certain case. For example, the first sending module may be described as "sending a first document obtaining request to the server in response to a triggering operation on target control in a mail editing page".

The functions described above may be partially performed by one or more hardware logic components. For example, the typical hardware logic components includes but not limited to: a field programmable gate array (FPGA), an application specific integrated circuit (ASIC), an application specific standard product (ASSP), a system on chip (SOC), a complex programmable logic device (CPLD) and so on.

The machine readable medium described in the present disclosure may be a tangible medium, which may contain or store programs to be used by an instruction execution system, apparatus or device, or to be used in combination with the instruction execution system, apparatus or device. The machine readable medium may be a machine readable signal medium or a machine readable storage medium. The machine readable medium may include but not limited to a system, an apparatus or a device in an electric, magnetic, optical, electromagnetic, infrared or a semiconductor form, or any combination thereof. The machine readable storage medium may include electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof.

A mail processing method is provided according to one or more embodiments of the present disclosure. The method includes: sending a first document obtaining request to a server in response to a triggering operation on target control in a mail editing page; receiving first document information of an on-line document sent by the server in response to the first document obtaining request, where authority control information of the first document information matches an account ID of a mail; sending a second document obtaining request to the server in response to a triggering operation to the first document information; receiving second document information sent by the server in response to the second document obtaining request; and generating the mail in the mail editing page based on the second document information.

In an embodiment, the process of sending a first document obtaining request to a server includes: obtaining the account ID of the mail; and sending the first document obtaining request to the server, where the first document obtaining request includes the account ID of the mail.

In an embodiment, the first document information includes at least one identifier of the on-line document. The triggering operation to the first document information includes selecting a target identifier among the at least one identifier.

In an embodiment, the second document information includes a link of a target on-line document indicated by the target identifier. The process of generating a mail in the mail editing page based on the second document information includes: generating the mail in the mail editing page by taking the link as a mail text.

In an embodiment, the second document information includes document content of a target on-line document indicated by the target identifier. The process of generating a mail in the mail editing page based on the second document information includes: generating the mail in the mail editing page based on the document content and in a preset display mode.

In an embodiment, the second document information includes document content and a document title of a target on-line document indicated by the target identifier. The process of generating a mail in the mail editing page based on the second document information includes: extracting preview content from the document content; converting the preview content from a word format into a picture format; and generating the mail in the mail editing page based on the preview content in the picture format and the document title.

A mail processing method is provided according to one or more embodiments of the present disclosure. The method includes: receiving a first document obtaining request sent from a terminal device; sending, in response to the first document obtaining request, first document information of an on-line document to the terminal device, where authority control information of the first document information matches an account ID of a mail; receiving a second document obtaining request sent by the terminal device in response to a triggering operation to the first document information; and sending second document information to the terminal device in response to a second document obtaining request, so that the terminal device generates a mail in a mail editing page based on the second document information.

In an embodiment, the first document obtaining request includes the account ID of the mail. The process of sending first document information of an on-line document to the terminal device in response to the first document obtaining request includes: determining at least one on-line document accessible by the account ID based on the account ID; and sending first document information of the at least one on-line document to the terminal device.

In an embodiment, the second document obtaining request includes the account ID of the mail and a target identifier. The process of sending second document information to the terminal device in response to the second document obtaining request includes: a target on-line document among the on-line document indicted by the target identifier based on the target identifier; and sending second document information of the target on-line document to the terminal device if it is determined that the target on-line document matches the account ID.

In an embodiment, the second document obtaining request includes a mail identifier. Before second document information is sent to the terminal device, the method further includes: converting a format of the second document information into a format applicable to the mail based on the mail identifier.

A mail processing apparatus is provided according to one or more embodiments of the present disclosure. The apparatus includes a first sending module, a first receiving module, a second sending module, a second receiving module and a generating module. The first sending module is configured to send a first document obtaining request to a server in response to a triggering operation on target control in a mail editing page. The first receiving module is configured to: receive first document information of an on-line document sent by the server in response to the first document obtaining request, where authority control information of the first document information matches an account ID of a mail. The second sending module is configured to: send a second document obtaining request to the server in response to a triggering operation to the first document information. The second receiving module is configured to receive second document information sent by the server in response to the second document obtaining request. The generating module is configured to generate the mail in the mail editing page based on the second document information.

In an embodiment, the first sending module is configured to: obtain the account ID of the mail; and send the first document obtaining request to the server, where the first document obtaining request includes the account ID of the mail.

In an embodiment, the first document information includes at least one identifier of the on-line document. The triggering operation to the first document information includes selecting a target identifier among the at least one identifier.

In an embodiment, the second document information includes a link of a target on-line document indicated by the target identifier. The generating module is configured to: generate the mail in the mail editing page by taking the link as a mail text.

In an embodiment, the second document information includes document content of a target on-line document indicated by the target identifier. The generating module is configured to: generate the mail in the mail editing page based on the document content and in a preset display mode.

In an embodiment, the second document information includes document content and a document title of a target on-line document indicated by the target identifier. The generating module is configured to: extract preview content from the document content; convert the preview content from a word format into a picture format; and generate the mail in the mail editing page based on the preview content in the picture format and the document title.

A mail processing apparatus is provided according to one or more embodiments of the present disclosure. The apparatus includes: a third receiving module, a third sending module, a fourth receiving module and a fourth sending module. The third receiving module is configured to: receive a first document obtaining request sent from a terminal device. The third sending module is configured to send, in response to the first document obtaining request, first document information of an on-line document to the terminal device, where authority control information of the first document information matches an account ID of a mail. The fourth receiving module is configured to receive a second document obtaining request sent by the terminal device in response to a triggering operation to the first document information. The fourth sending module is configured to send second document information to the terminal device in response to a second document obtaining request, so that the terminal device generates a mail in a mail editing page based on the second document information.

In an embodiment, the first document obtaining request includes the account ID of the mail. The third sending module is configured to determine at least one on-line document accessible by the account ID based on the account ID; and send first document information of the at least one on-line document to the terminal device.

In an embodiment, the second document obtaining request includes the account ID of the mail and a target identifier. The fourth sending module is configured to: determine a target on-line document among the on-line document indicted by the target identifier based on the target identifier; and send second document information of the target on-line document to the terminal device if it is determined that the target on-line document matches the account ID.

In an embodiment, the apparatus includes a format conversion module. The second document obtaining request includes a mail identifier. Before the fourth sending module sends the second document information to the terminal device, the format conversion module is configured to convert a format of the second document information into a format applicable to the mail based on the mail identifier.

Only preferred embodiments of the present disclosure and the technical principles applied are described above. It should be understood by those skilled in the art that, the protection scope of the embodiments of the present disclosure is not limited to the technical solutions formed by a specific combination of the above technical features, and the protection scope of the present disclosure also covers other technical solutions formed by any combination of the above technical features and equivalent features thereof without departing from the concept of the present disclosure, for example, the technical solutions formed by mutual replacement between the above technical features and the technical features with similar functions disclosed in the embodiments of the present disclosure (not limited).

Although the operations are described in a specific order, the operations are unnecessarily to be performed in the specific order or in a chronological order. In a certain environment, a multi-task and parallel processing may be beneficial. Although specific details are described above, the details should not be understood as restriction to the scope of the present disclosure. Some features described in the context of different embodiments may be combined in one embodiment. Alternatively, the features described in the context of one embodiment may be implemented in multiple embodiments independently or in any appropriate sub-combination.

The subject matter is described by language specific to the structure feature and/or method logic, it should be understood that the subject matter defined in the appended claims is not limited to the specific features or actions described above. The specific features and actions are only schematic implementation of the claims.

The invention claimed is:

1. A mail processing method, comprising:
   sending a first document obtaining request to a server in response to a triggering operation on target control in mail editing page;
   receiving first document information of an on-line document sent by the server in response to the first document obtaining request, wherein authority control information of the first document information matches an account ID of a mail;
   sending a second document obtaining request to the server in response to a triggering operation to the first document information;
   receiving second document information sent by the server in response to the second document obtaining request; and
   generating the mail in the mail editing page based on the second document information.

2. The method according to claim 1, wherein the sending a first document obtaining request to a server comprises:
   obtaining the account ID of the mail; and
   sending the first document obtaining request to the server, wherein the first document obtaining request comprises the account ID of the mail.

3. The method according to claim 1, wherein the first document information comprises at least one identifier of the on-line document;
   wherein the triggering operation to the first document information comprises selecting a target identifier among the at least one identifier.

4. The method according to claim 3, wherein the second document information comprises a link of a target on-line document indicated by the target identifier;
   wherein the generating a mail in the mail editing page based on the second document information comprises:
   generating the mail in the mail editing page by taking the link as a mail text.

5. The method according to claim 3, wherein the second document information comprises document content of a target on-line document indicated by the target identifier;
   wherein the generating a mail in the mail editing page based on the second document information comprises:

generating the mail in the mail editing page based on the document content and in a preset display mode.

6. The method according to claim 3, wherein the second document information comprises document content and a document title of a target on-line document indicated by the target identifier;
wherein the generating a mail in the mail editing page based on the second document information comprises:
extracting preview content from the document content;
converting the preview content from a word format into a picture format; and
generating the mail in the mail editing page based on the preview content in the picture format and the document title.

7. A mail processing method, comprising:
receiving a first document obtaining request sent from a terminal device;
sending, in response to the first document obtaining request, first document information of an on-line document to the terminal device, wherein authority control information of the first document information matches an account ID of a mail;
receiving a second document obtaining request sent by the terminal device in response to a triggering operation to the first document information; and
sending second document information to the terminal device in response to a second document obtaining request, so that the terminal device generates a mail in a mail editing page based on the second document information.

8. The method according to claim 7, wherein the first document obtaining request comprises the account ID of the mail;
wherein the sending first document information of an on-line document to the terminal device in response to the first document obtaining request comprises:
determining at least one on-line document accessible by the account ID based on the account ID; and
sending first document information of the at least one on-line document to the terminal device.

9. The method according to claim 7, wherein the second document obtaining request comprises the account ID of the mail and a target identifier;
wherein the sending second document information to the terminal device in response to the second document obtaining request comprises:
determine a target on-line document among the on-line document indicted by the target identifier based on the target identifier; and
sending second document information of the target on-line document to the terminal device if it is determined that the target on-line document matches the account ID.

10. The method according to claim 7, wherein the second document obtaining request comprises a mail identifier;
wherein before the sending second document information to the terminal device, the method further comprises:
converting a format of the second document information into a format applicable to the mail based on the mail identifier.

11. A mail processing apparatus, comprising:
at least one processor; and
at least one memory communicatively coupled to the at least one processor and storing instructions that upon execution by the at least one processor cause the apparatus to:

send a first document obtaining request to a server in response to a triggering operation on target control in a mail editing page;
receive first document information of an on-line document sent by the server in response to the first document obtaining request, wherein authority control information of the first document information matches an account ID of a mail;
send a second document obtaining request to the server in response to a triggering operation to the first document information;
receive second document information sent by the server in response to the second document obtaining request; and
generate the mail in the mail editing page based on the second document information.

12. A mail processing apparatus, comprising:
at least one processor; and
at least one memory communicatively coupled to the at least one processor and storing instructions that upon execution by the at least one processor cause the apparatus to: perform the method according to claim 7.

13. A non-transitory computer readable medium storing computer programs, wherein the programs are executed by a processor to implement the method according claim 1.

14. The apparatus of claim 11, the at least one memory further storing instructions that upon execution by the at least one processor cause the apparatus to:
obtain the account ID of the mail; and
send the first document obtaining request to the server, wherein the first document obtaining request comprises the account ID of the mail.

15. The apparatus of claim 11, wherein the first document information comprises at least one identifier of the on-line document;
the at least one memory further storing instructions that upon execution by the at least one processor cause the apparatus to:
select a target identifier among the at least one identifier.

16. The apparatus of claim 15, wherein the second document information comprises a link of a target on-line document indicated by the target identifier;
the at least one memory further storing instructions that upon execution by the at least one processor cause the apparatus to:
generate the mail in the mail editing page by taking the link as a mail text.

17. The apparatus of claim 15, wherein the second document information comprises document content of a target on-line document indicated by the target identifier;
the at least one memory further storing instructions that upon execution by the at least one processor cause the apparatus to:
generate the mail in the mail editing page based on the document content and in a preset display mode.

18. The apparatus of claim 15, the at least one memory further storing instructions that upon execution by the at least one processor cause the apparatus to:
extract preview content from the document content;
convert the preview content from a word format into a picture format; and
generate the mail in the mail editing page based on the preview content in the picture format and the document title.

* * * * *